US012642722B1

(12) United States Patent
Wang et al.

(10) Patent No.: US 12,642,722 B1
(45) Date of Patent: Jun. 2, 2026

(54) TRANSFER BENCH

(71) Applicant: FOSHAN DAHAO MEDICAL TECHNOLOGY CO., LTD., Foshan (CN)

(72) Inventors: Zhongsheng Wang, Foshan (CN); Zehui Huang, Foshan (CN); Jinliang Jiang, Foshan (CN); Guoyi Hu, Foshan (CN); Yuqin Yin, Foshan (CN); Yingyu Yin, Foshan (CN)

(73) Assignee: FOSHAN DAHAO MEDICAL TECHNOLOGY CO., LTD., Foshan (CN)

( * ) Notice: Subject to any disclaimer, the term of this patent is extended or adjusted under 35 U.S.C. 154(b) by 0 days.

(21) Appl. No.: 19/326,829

(22) Filed: Sep. 12, 2025

(30) Foreign Application Priority Data

Jul. 10, 2025 (CN) ......................... 202521451895.0

(51) Int. Cl.
*A61G 5/14* (2006.01)
*A61G 7/053* (2006.01)
*A61G 7/10* (2006.01)
*A61H 3/04* (2006.01)

(52) U.S. Cl.
CPC ............... *A61G 5/14* (2013.01); *A61G 7/053* (2013.01); *A61G 7/10* (2013.01); *A61G 7/1046* (2013.01); *A61G 7/1059* (2013.01); *A61G 7/1069* (2013.01); *A61G 7/1074* (2013.01); *A61H 3/04* (2013.01); *A61G 2200/34* (2013.01)

(58) Field of Classification Search
CPC . A61G 5/14; A61G 7/053; A61G 7/10; A61G 7/1046; A61G 7/1059; A61G 7/1069; A61G 7/1074; A61G 2200/34; A61H 3/04
USPC .......................................... 297/314; 5/81.1 R
See application file for complete search history.

(56) References Cited

U.S. PATENT DOCUMENTS 3,394,933 A * 7/1968 Benoit ..................... A61H 3/04 482/67
3,407,413 A * 10/1968 James .................. A61G 7/1094 5/87.1
3,914,808 A * 10/1975 Woods ................. A61G 7/1046 5/83.1
3,940,808 A * 3/1976 Petrini ................. A61G 7/1076 5/81.1 RP
4,890,853 A * 1/1990 Olson ....................... A61G 7/10 280/47.4
6,430,761 B1 * 8/2002 Brandorff .............. A61G 7/053 5/81.1 R (Continued)

FOREIGN PATENT DOCUMENTS

DE 3615412 C2 * 8/1995 ........... A61G 7/1059

*Primary Examiner* — Robert Canfield
(74) *Attorney, Agent, or Firm* — Cooper Legal Group, LLC

(57) ABSTRACT

A transfer bench includes a bottom frame with a plurality of casters, a support member having a vertical axis and connected to the bottom frame, a horizontal member provided on the support member and extending from the support member to two sides of the support member in a horizontal direction, a seat frame connected to the horizontal member, and handle assemblies connected to the horizontal member. The support member is provided with a mounting portion configured to detachably connect the horizontal member to the support member, and the support member is further provided with a protrusion higher than the mounting portion.

19 Claims, 9 Drawing Sheets

(56) References Cited

U.S. PATENT DOCUMENTS

| | | | | |
|---|---|---|---|---|
| 6,899,660 | B1 * | 5/2005 | Chin | A61H 3/008<br>135/85 |
| 9,579,001 | B2 * | 2/2017 | Ahmed | A61G 7/1059 |
| 11,839,577 | B2 * | 12/2023 | Saayman | A61G 7/1048 |
| 12,213,928 | B2 * | 2/2025 | Li | A61G 5/14 |
| 12,280,001 | B2 * | 4/2025 | Li | A61G 7/1059 |
| 12,414,888 | B2 * | 9/2025 | Lin | A61G 7/1059 |
| 12,569,385 | B2 * | 3/2026 | Li | A61G 7/1019 |
| 2009/0249544 | A1 * | 10/2009 | Palay | A61G 7/1036<br>5/89.1 |
| 2010/0229299 | A1 * | 9/2010 | Lear | A61G 7/1046<br>5/89.1 |
| 2013/0007957 | A1 * | 1/2013 | Chun | A61G 7/1019<br>5/83.1 |
| 2015/0313783 | A1 * | 11/2015 | Saayman | A61G 7/1067<br>5/87.1 |
| 2022/0323279 | A1 * | 10/2022 | Li | A61G 7/1013 |
| 2023/0028164 | A1 * | 1/2023 | Mauro | G06Q 10/06375 |
| 2023/0125855 | A1 * | 4/2023 | Tsukamoto | A61G 7/1019<br>5/86.1 |
| 2023/0218459 | A1 * | 7/2023 | Li | A61G 7/1019<br>5/81.1 R |
| 2023/0218462 | A1 * | 7/2023 | Li | A61G 5/14<br>5/86.1 |
| 2024/0398644 | A1 * | 12/2024 | Lin | A61G 5/0875 |
| 2025/0000731 | A1 * | 1/2025 | Lin | A61G 7/1088 |

* cited by examiner

TRANSFER BENCH

CROSS-REFERENCE TO RELATED APPLICATION

This application claims the priority benefit of Chinese application No. 202521451895.0, filed on Jul. 10, 2025. The entirety of Chinese application No. 202521451895.0 is hereby incorporated by reference herein and made a part of this specification.

TECHNICAL FIELD

The present application relates to the technical field of medical devices, and in particular, to a transfer bench.

DESCRIPTION OF RELATED ART

A transfer bench enables elderly or individuals with leg injuries to move safely between regular seats, sofas, wheelchairs and toilets, to enhance their initiative in daily activities while making caregiving easier and safer, and to significantly reduce the workload of caregivers, making the entire process smooth and pleasant.

In the existing technology, when the connecting members and components of the transfer bench are relatively large in size, they are fixed together by welding or threaded connections, which is not conducive to disassembly or compact folding for storage. Alternatively, some designs with smaller dimensions restrict the user's movement and compromise riding comfort. Current transfer benches have significant usage limitations and lack flexibility, requiring further improvement.

SUMMARY

The purpose of the present application is to solve the above-mentioned problems and provide a transfer bench with a simple structure and improved comfort.

A transfer bench of the present application includes:

a bottom frame with a plurality of casters, a support member having a vertical axis and connected to the bottom frame, a horizontal member provided on the support member and extending from the support member to two sides of the support member in a horizontal direction, a seat frame connected to the horizontal member, and handle assemblies connected to the horizontal member.

The support member is provided with a mounting portion configured to detachably connect the horizontal member to the support member, and the support member is further provided with a protrusion higher than the mounting portion.

Optionally, the horizontal member is detachably connected to the support member by dowel pins.

Optionally, the horizontal member includes two horizontal support rods respectively disposed on the two sides of the support member, the mounting portion is correspondingly provided on the two sides of the support member, and the seat frame is connected to the two horizontal support rods.

Optionally, the seat frame includes two closure frames, the two closure frames are laterally openable and fixed respectively on the two horizontal support rods, and each of the two horizontal support rods is configured to be laterally pivotable around a respective one of the dowel pins together with a respective one of the two closure frames to form an opened operational state and a closed operational state.

Optionally, each of the two closure frames includes a vertical support rod connected to the horizontal member, a frame loop connected to the vertical support rod, and a seat plate mounted on the frame loop.

Optionally, the frame loop includes a side support rod and a back support rod, the seat plate includes a left seat plate segment and a right seat plate segment and is configured with an opening in a central region of the seat plate, each of the left seat plate segment and the right seat plate segment is mounted on the side support rod and the back support rod and includes a first edge, a second edge and a third edge, an angle $\alpha$ between a tangent line of the first edge adjacent to the side support rod and the side support rod is less than or equal to 90 degrees.

Optionally, the second edge is configured such that its distance from the side support rod gradually increases in a direction away from the first edge, distances from both the second edge and the third edge to the back support rod gradually decrease in the direction away from the first edge, and a region enclosed by the first edge and an extension line of the second edge toward the side support rod forms a reinforced section of the seat plate.

Optionally, the side support rod is provided with a protective sleeve, and the back support rod is provided with a protective sleeve.

Optionally, the protective sleeve on the back support rod is configured with a horizontally L-shaped handhold groove.

Optionally, the side support rod includes an upper segment and a lower segment that are mutually parallel, the back support rod is configured as a bent segment, and the frame loop is formed by bending a single pipe.

Optionally, the vertical support rod is formed by bending a single pipe and includes a vertical segment extending vertically and an inclined segment, a first end of the vertical segment is connected to a respective one of the two horizontal support rods, and a second end of the vertical segment is connected to the upper segment.

Optionally, the seat frame includes a frame assembly connected to the horizontal member, and the frame assembly includes two vertical support rods respectively connected to two ends of the horizontal member, two side support rods on two sides of the frame assembly, and a seat cushion assembly and a back support rod arranged on the two side support rods.

Optionally, each of the handle assemblies is arranged on the vertical support rod to be connected to a respective one of the two horizontal support rods, and each of the handle assemblies includes a connecting segment and a handle segment. The connecting segment is equipped with a collapsible structure, and the handle assembly is configured to be folded on the vertical support rod or beside the vertical support rod.

Optionally, the bottom frame includes a transverse assembly frame and support legs arranged at two ends of the transverse assembly frame, each of the support legs includes a support foot rod and mounting members at two ends of the support foot rod, and the plurality of casters are mounted on the support legs.

Optionally, the transverse assembly frame includes a first transverse rod, second transverse rods and fasteners located on two ends of the first transverse rod, the first transverse rod is configured with threaded holes, and each of the second transverse rods is fixed at a respective one of the threaded holes via a respective one of the fasteners.

Optionally, the transverse assembly frame further includes a wear-resistant sleeve between the first transverse rod and each of the second transverse rods.

Optionally, the support member includes a bottom support rod, a top support rod, and an adjustment mechanism for adjusting a height of the support member.

Optionally, the first transverse rod and the second transverse rods have approximately square cross-sections, and a flat plate-shaped foot pedal is provided on the transverse assembly frame.

The present application further discloses a transfer bench, including:

a bottom frame including a transverse assembly frame and support legs arranged at two ends of the transverse assembly frame, where a plurality of casters are mounted on the support legs, the transverse assembly frame includes a first transverse rod and second transverse rods located on two ends of the first transverse rod, and a relative position of the first transverse rod and the second transverse rods is adjustable transversely, a support member having a vertical axis and connected to the bottom frame, a horizontal member provided on the support member and extending from the support member to two sides of the support member in a horizontal direction, a seat frame connected to the horizontal member, the seat frame includes a frame assembly connected to the horizontal member, the frame assembly includes two vertical support rods respectively connected to two ends of the horizontal member, two side support rods on two sides of the frame assembly, and a seat cushion assembly and a back support rod arranged on the two side support rods, the seat cushion assembly includes a seat plate and safety buckles, and the seat plate is detachably connected to the two side support rods by the safety buckles, and handle assemblies connected to the horizontal member.

The support member is provided with a mounting portion configured to detachably connect the horizontal member to the support member, and the support member is further provided with a protrusion higher than the mounting portion.

The advantages of the present application are as follows. On the one hand, the transfer bench provides greater movement space and facilitates caregiving. When a user sits on the seat frame, his legs can be placed on both sides of the support member, increasing the lateral movement space and improving seating comfort. On the other hand, the protrusion is higher than the mounting portions vertically, which protects the mounting portions from vertical external forces without hindering the disassembly of the horizontal member. Furthermore, the seat plate enhances load-bearing capacity while providing greater legroom during use, improving carrying capacity and comfort while the overall aesthetics of the transfer bench.

DESCRIPTION OF THE EMBODIMENTS

The technical solutions in the embodiments of the present application will be clearly and completely described below with reference to the accompanying drawings. Understandably, the described embodiments are only part of the embodiments of the present application, rather than all of them. Based on the embodiments herein, all other embodiments obtained by those of ordinary skill in the art without creative efforts shall fall within the protection scope of the present application.

It should be noted that all directional indications (such as up, down, left, right, front, rear, . . . ) in the embodiments of the present application are only used to explain the relative positional relationship, movement status, etc. between components in a specific posture (as shown in the accompanying drawings). If the specific posture changes, the directional indications will change accordingly.

It should also be noted that when an element is referred to as being "fixed to" or "provided on" another element, it can be directly on the other element or an intervening element may be present. When an element is referred to as being "connected" to another element, it can be directly connected to the other element or intervening elements may be present.

In addition, references to "first", "second", etc. in the present application are for descriptive purposes only and should not be construed as indicating or implying relative importance, or implicitly specifying the quantity of the indicated technical features. Thus, features defined as "first" and "second" may explicitly or implicitly include at least one such feature. Furthermore, the technical solutions of the various embodiments may be combined, but such combination must be realizable by those of ordinary skill in the art. If the combination is contradictory or unrealizable, it should be considered that such a combination does not exist and is not within the protection scope claimed by the present application.

Figure 1:
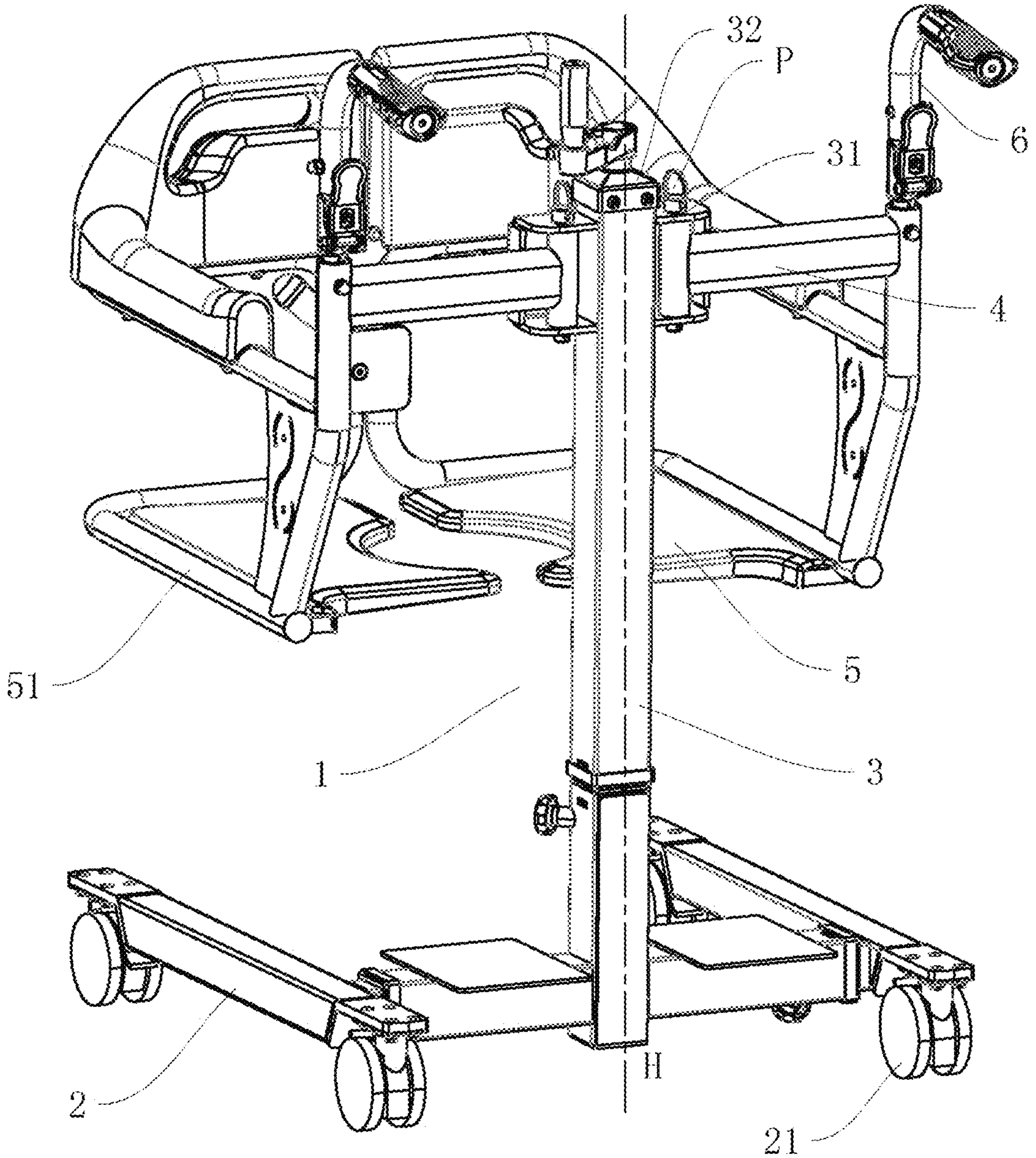
FIG. 1 is a schematic view of an embodiment of the present disclosure.

Referring to FIG. 1, the present application discloses a transfer bench 1, which includes a bottom frame 2 with a plurality of casters 21, a support member 3 having a vertical axis H and connected to the bottom frame 2, a horizontal member 4 on the support member 3 and extending horizontally to two sides of the support member, a seat frame 5 connected to the horizontal member 4 and including two laterally openable closure frames 51, and handle assemblies 6 connected to the horizontal member 4. The support member 3 is provided with a mounting portion 31 configured to detachably connect the horizontal member 4 to the support member 3. The support member 3 is further provided with a protrusion 32 higher than the mounting portion 31 in a vertical direction. On the one hand, as a single support member 3 is used for support, the transfer bench 1 provides more space for caregiving operations. When a user sits on the seat frame 5, his legs can be placed on both sides of the support member 3, increasing lateral movement space and improving user comfort. On the other hand, the protrusion 32 is higher than the mounting portions 31 in the vertical direction, which provides a physical obstruction along the vertical axis to the mounting portion 31 without hindering the disassembly of the horizontal member 4, thereby protecting the mounting portion 31. The figure shows the operational space and protective space in the vertical direction for the disassembly of the horizontal member 4 formed by the protrusion 32.

In one embodiment, the horizontal member 4 and the support member 3 are detachably connected with each other by pin-and-aperture mechanism. One of the mounting portion 31 and the horizontal member 4 is configured with an aperture, and the other is provided with a corresponding pin. The engagement of the pin and the aperture enables positioning and detachable connection between the mounting portion 31 and the horizontal member 4, thereby achieving detachable connection of the support member 3 and the seat frame 5. This configuration accommodates various types of seat frames and enhances the versatility of the transfer bench 1.

In another embodiment, both the mounting portion 31 and the horizontal member 4 are configured with alignment holes 313. The mounting portion 31 and the horizontal member 4 are positioned and detachable by a dowel pin 314 inserted through the alignment holes 313, facilitating assembly and disassembly.

Figure 2:
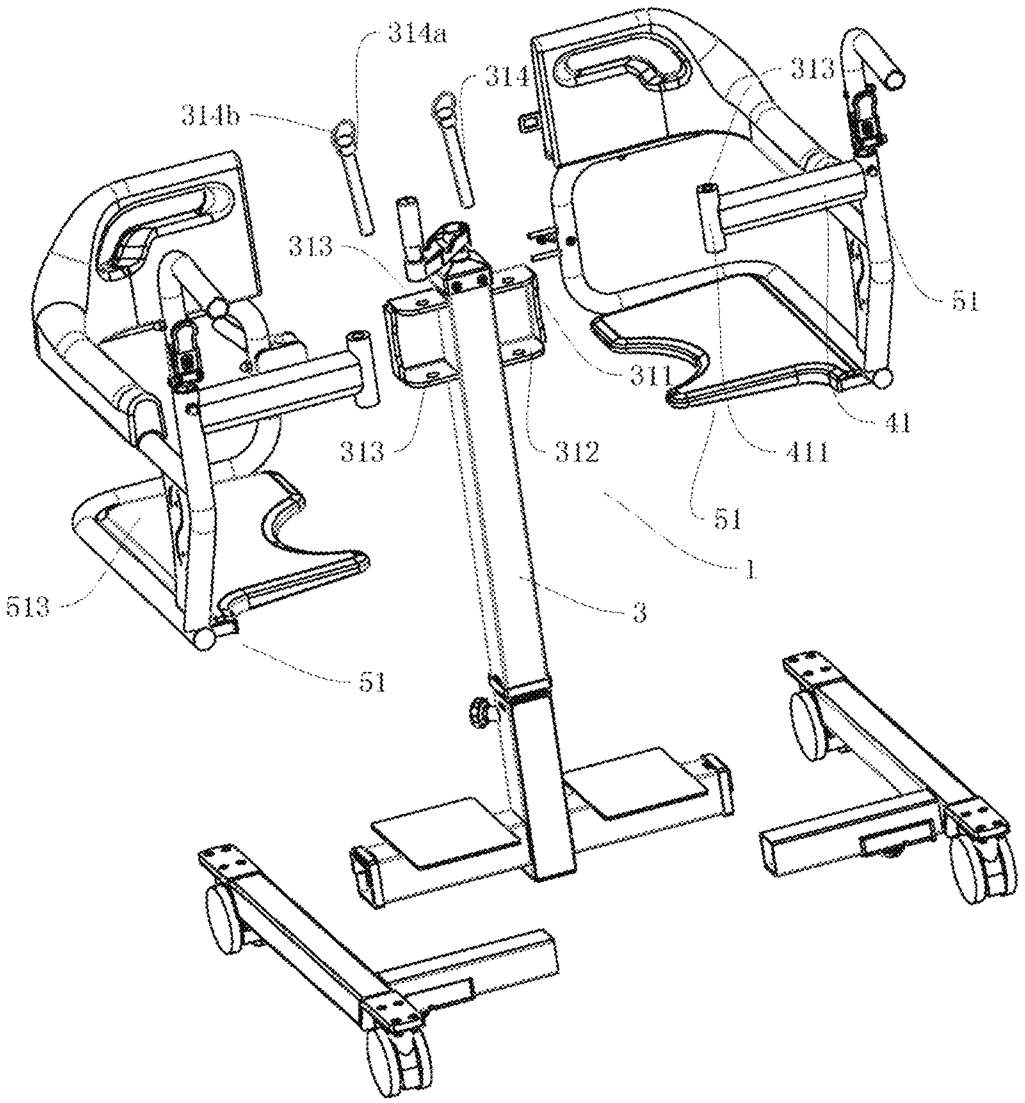
FIG. 2 is an exploded schematic view of an embodiment of the present disclosure.

Referring to FIG. 2, in one embodiment, the horizontal member 4 includes two horizontal support rods 41 respectively disposed on both sides of the support member 3, and the mounting portion 31 is correspondingly provided on both sides of the support member 3. The seat frame 5 is movably or fixedly connected to the two horizontal support rods 41. In one embodiment, two dowel pins 314 are provided, each configured to position an end of the respective horizontal support rod 41 close to the support member 3, facilitating the disassembly of the respective horizontal support rod 41 and the seat frame 5. Further, the mounting portion 31 includes an upper mounting wall 311 and a lower mounting wall 312. The end of each horizontal support rod 41 close to the support member 3 is provided with a shaft sleeve 411. The upper mounting wall 311, the lower mounting wall 312 and shaft sleeve 411 are all configured with alignment holes 313, allowing the dowel pin 314 to penetrate through them to form a secured structure. By removing the dowel pin 314 along the vertical axis, the horizontal support rod 41 can be detached from the mounting portion 31, thereby allowing the seat frame 5 to be disassembled.

Figure 3:
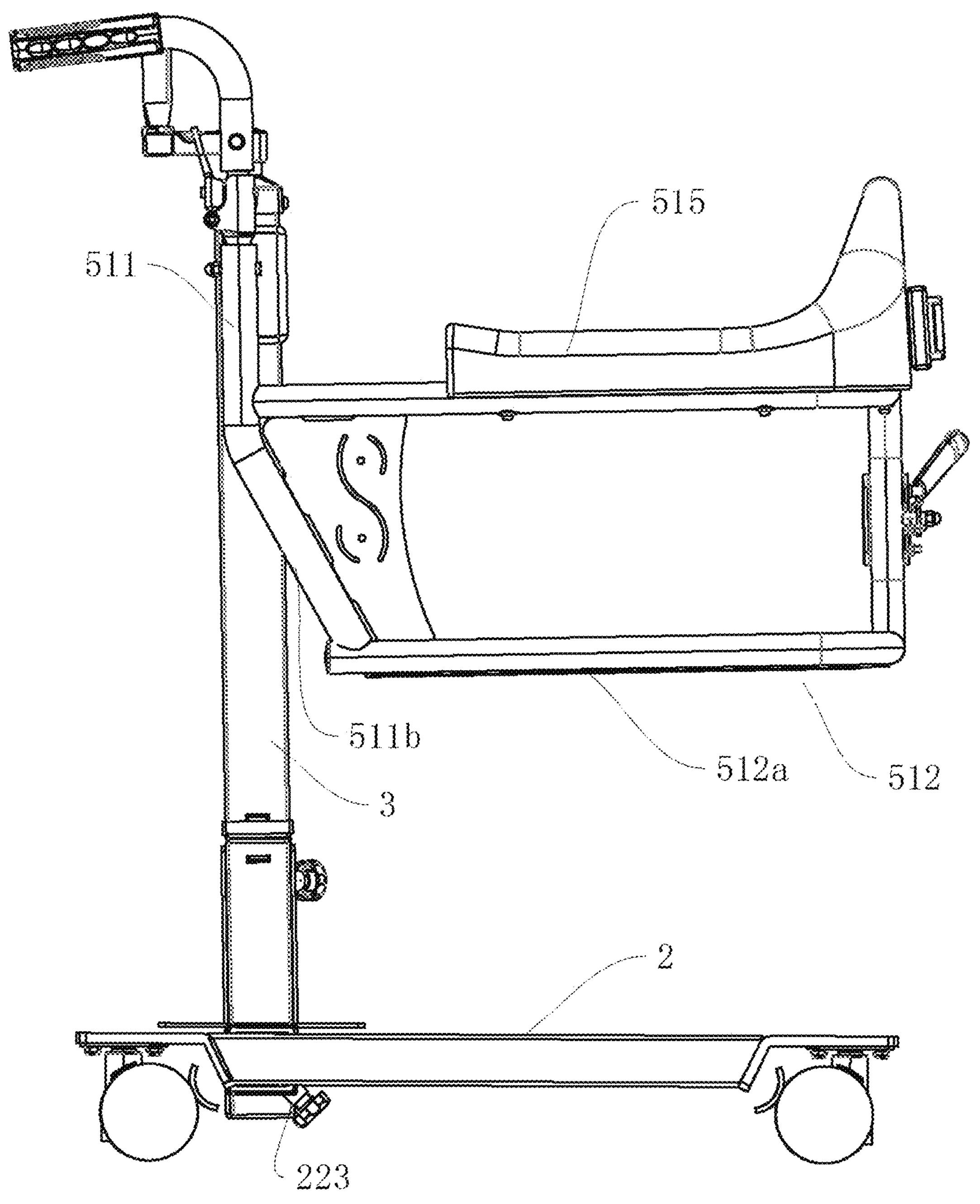
FIG. 3 is a side view of an embodiment of the present disclosure.

Referring to FIG. 3, in one embodiment, the seat frame 5 includes left and right closure frames 51, each of which is fixed on a respective horizontal support rod 41. Each horizontal support rod 41 together with the respective closure frame 51 is pivotable about the dowel pin 314 laterally, to form an opened operational state and a closed operational state, facilitating receiving and transporting a user. Further, the closure frames 51 are disposed at the distal ends of the horizontal support rods 41 away from the support member 3.

Figure 4:
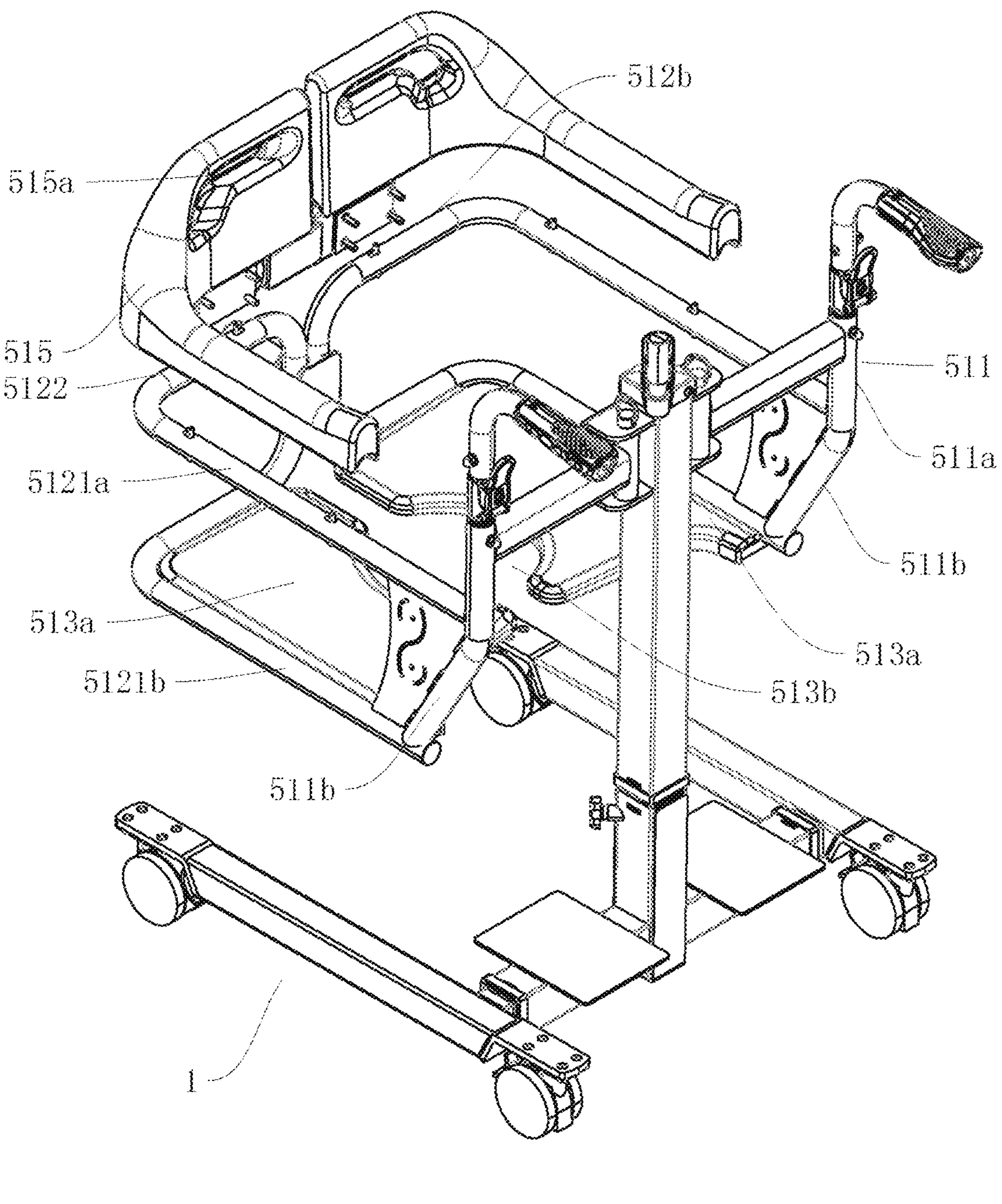
FIG. 4 is a partial exploded schematic view of an embodiment of the present disclosure.

Referring to FIG. 4, the closure frame 51 includes a first vertical support rod 511 connected to the horizontal member 4, a frame loop 512 on the first vertical support rod 511, and a first seat plate 513 on the frame loop 512. The first vertical support rod 511, the frame loop 512 and the horizontal support rod 41 together form a protected space for the user. The frame loop 512 may be either assembled from multiple segments or formed as a single continuous piece.

Figure 5:
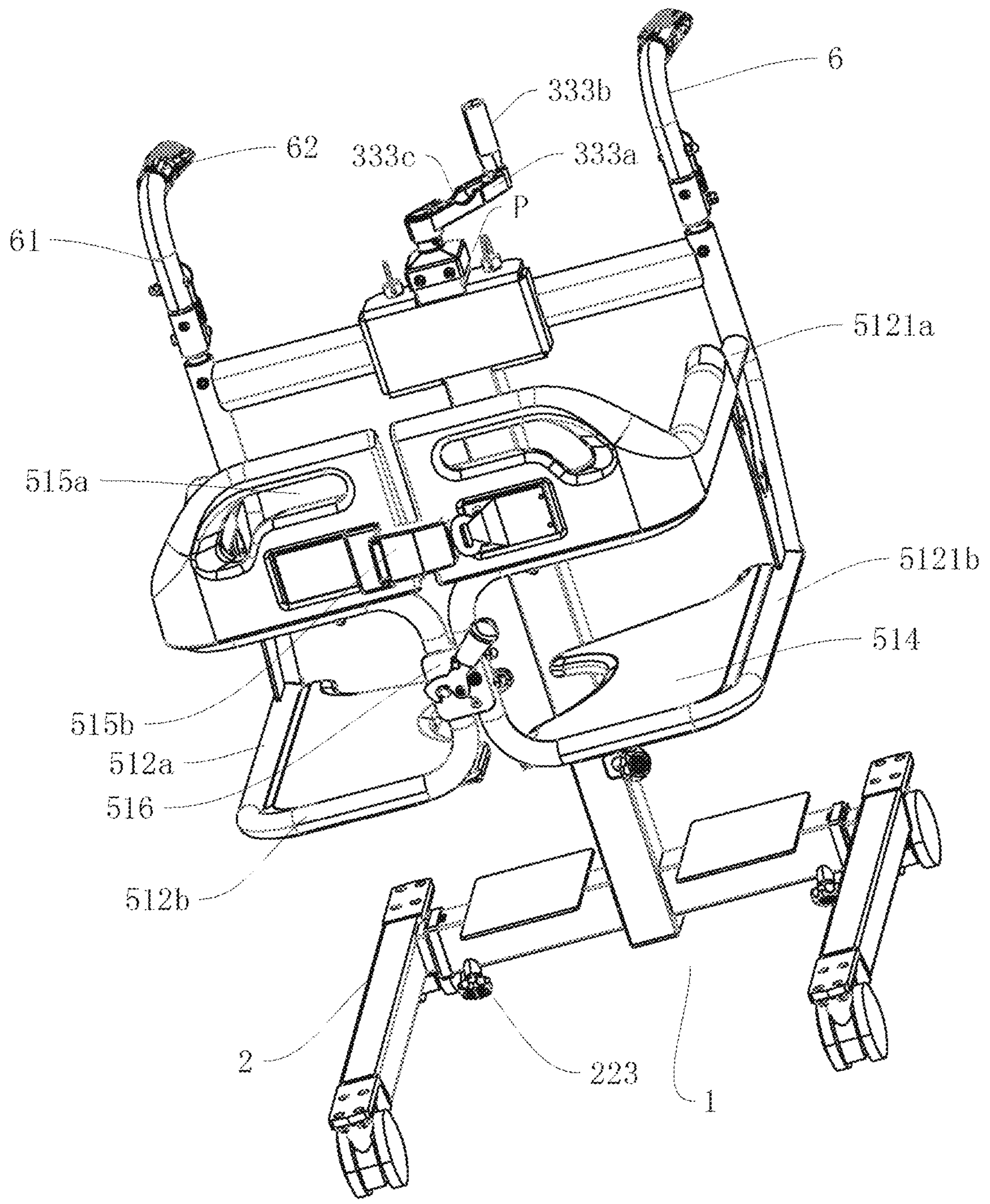
FIG. 5 is a rear view of an embodiment of the present disclosure.
Figure 6:
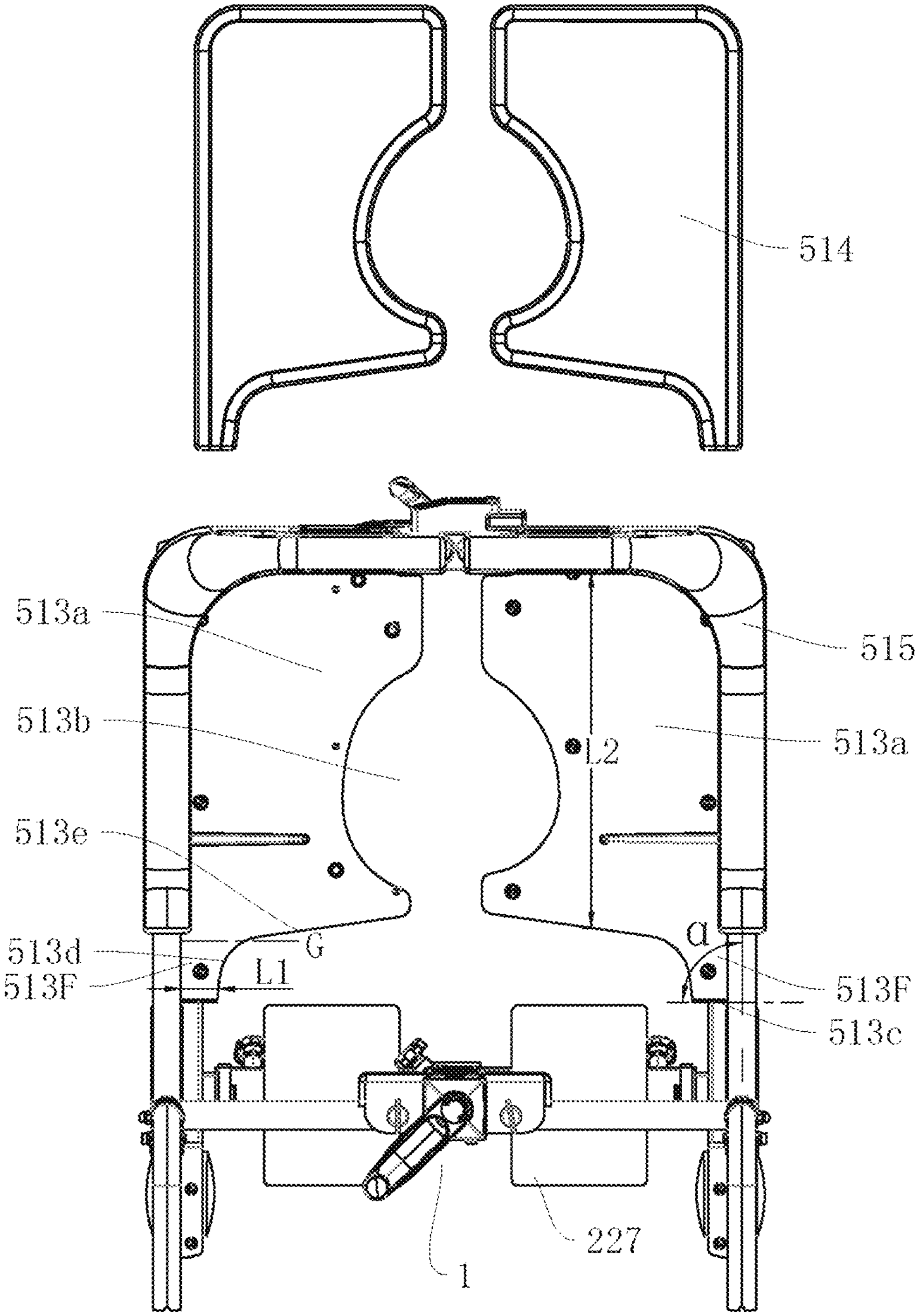
FIG. 6 is a top view with the flexible cushion removed in an embodiment of the present disclosure.

Referring to FIGS. 5 and 6, the frame loop 512 includes a side support rod 512*a* and a back support rod 512*b*. A first seat plate segment 513*a* is mounted on the side support rod 512*a* and the back support rod 512*b*, and the first seat plate 513 is formed by a left first seat plate segment and a right first seat plate segment 513*a*. In one embodiment, the first seat plate 513 is configured with an opening 513*b* in its generally central region. The first seat plate segment 513*a* includes a first edge 513*c*, a second edge 513*d* and a third edge 513*e*, an angle α between a tangent line of the first edge 513*c* near the side support rod 512*a* and the side support rod 512*a* is less than or equal to 90 degrees, facilitating sitting for defecation when needed while maintaining strong stability. Further, the second edge 513*d* is configured such that its distance from the side support rod 512*a* gradually increases in a direction away from the first edge 513*c*, while distances from both the second edge 513*d* and the third edge 513*e* to the back support rod 512*b* gradually decrease in the direction away from the first edge 513*c*. The region enclosed by the first edge 513*c* and an extension line G of the second edge 513*d* toward the side support rod 512*a* forms a reinforced section 513F of the first seat plate 513, serving to enhance the load-bearing capacity of the first seat plate 513. The second edge 513*d* and the third edge 513*e* together form a smooth body clearance portion, allowing the user's legs to be comfortably positioned and improving the riding experience. In one embodiment, $60° \leq \alpha \leq 90°$, so as to effectively distribute the bearing force on the first seat plate 513 to the side support rod 512*a*, thereby enhancing the stability of the first seat plate 513 and extending its service life. In one embodiment, the first seat plate 513 is made of metal. In one embodiment, a flexible cushion 514 is provided on the first seat plates 513 to improve user comfort. An additional soft padding 514*a* may also be placed on the flexible cushion 514 to cover the opening 513*b* in the first seat plate 513, further enhancing the riding comfort.

In one embodiment, the side support rod 512*a* and the back support rod 512*b* are both provided with protective sleeves 515 with a smooth upper surface, facilitating comfortable support for the user's body and allowing relaxed resting. In one embodiment, the protective sleeve 515 on the back support rod 512*b* is configured with a generally horizontal L-shaped handhold groove 515*a* for convenient operation, increasing ventilation space for the user's back while providing a comfortable back support. It also allows the user to grip through the handhold groove 515*a* to rotate the frame loop 512 between opened and closed positions. In one embodiment, the protective sleeve 515 is provided with a safety strap 515*b* for connecting the left and right protective sleeves 515, further improving the safety of the transfer bench 1.

In one embodiment, the side support rod 512*a* of the frame loop 512 includes an upper segment 5121*a* and a lower segment 5121*b* that are mutually parallel. The back support rod 512*b* of the frame loop 512 is a bent segment. The upper segment 5121*a*, the lower segment 5121*b* and the bent segment enclose and protect the person's side waist and back. The frame loop 512 is formed by bending a single pipe, simplifying the manufacturing process, and facilitating integrated production while improving the strength of the frame loop 512. Further, the first seat plate 513 is welded and fixed to the bottom of the frame loop 512, simplifying manufacturing and enhancing the stability of the first seat plate 513. In one embodiment, a lock assembly 516 is provided on the bent segment to secure the frame loop 512, ensuring the safety of the person.

In one embodiment, the first vertical support rod 511 is formed by bending a single pipe and includes a vertical segment 511*a* and an inclined segment 511*b*. The vertical segment 511*a* extends vertically, with one end connected to the horizontal support rod 41 and the other end connected to the upper segment 5121*a*. The inclined segment 511*b* is inclined relative to the vertical segment 511*a* toward the side support rod 512*a*, and the end of the inclined segment 511*b* away from the vertical segment 511*a* is connected to the lower segment 5121*b*. The first vertical support rod 511, the upper segment 5121*a*, and the lower segment 5121*b* lie in the same plane. The frame loop 512 is mounted on the bent first vertical support rod 511, which not only forms a structurally simple seat frame 5 but also enhances the load-bearing capacity of the frame loop 512 due to the single-tube construction of the first vertical support rod 511. Additionally, the inclined arrangement of the inclined segment 511*b* provides greater legroom during use, improving both the load-bearing capacity and comfort while improving the overall aesthetics of the transfer bench 1. In one embodiment, a decorative plate is provided between the upper segment 5121*a* and the lower segment 5121*b* of the side support rod 512*a*, which improves the decorative appeal while increasing the strength of the closure frame 51.

In one embodiment, the cross-sectional shape of each horizontal support rod 41 is roughly elliptical, facilitating comfortable gripping.

In one embodiment, each dowel pin 314 may include a flange 314*a* with an enlarged cross-section to retain the dowel pin 314 relative to the upper mounting wall 311. An operation ring 314*b* is provided on the flange 314*a* to facilitate moving the dowel pin 314 for disassembling the horizontal support rod 41.

Figure 7:
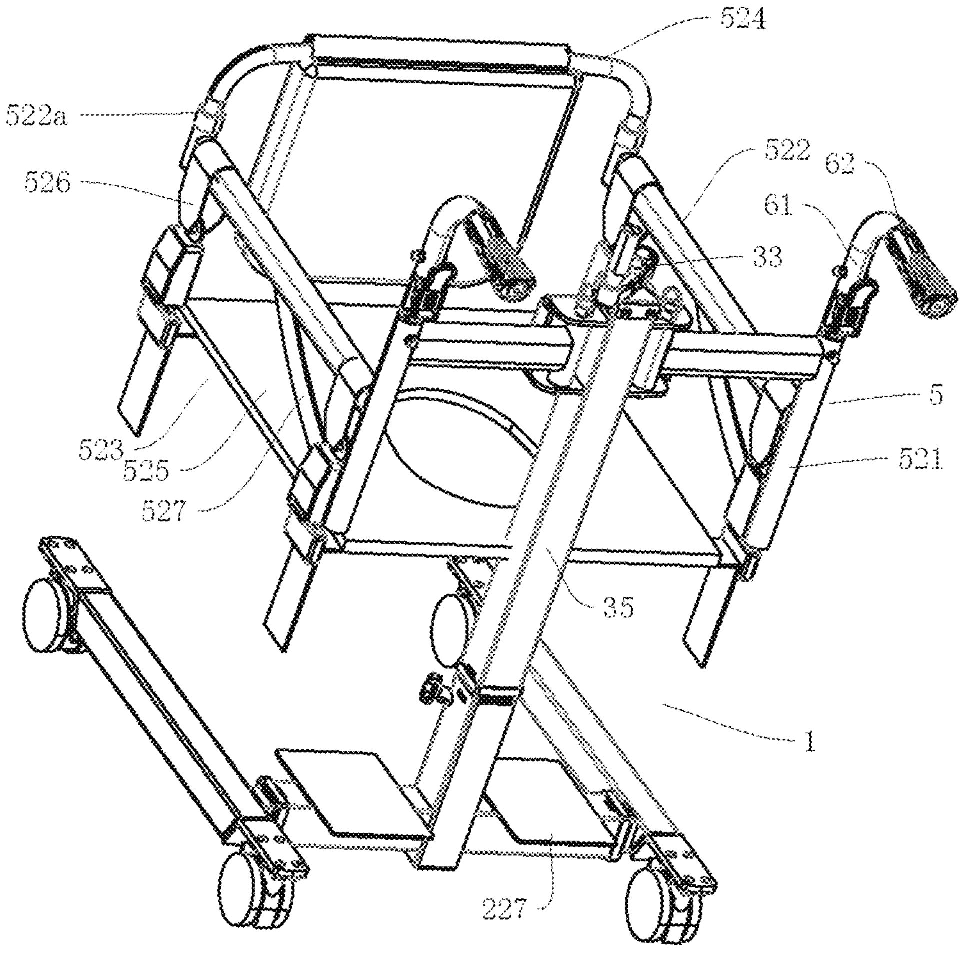
FIG. 7 is a schematic view of another embodiment of the present disclosure.

Referring to FIG. 7, in another embodiment, the seat frame 5 includes a frame assembly mounted on the horizontal member 4. The frame assembly includes second vertical support rods 521 connected to the horizontal member 4, side support rods 522 on two sides, and a seat cushion assembly and a back support rod 524 disposed on the side support rods 522, thereby forming an enclosure for protecting the person. The seat cushion assembly includes a second seat plate 525 and safety buckles 526. The second seat plate 525 is detachably connected to the side support rods 522 by the safety buckles 526, providing stable load support, ensuring safe seating while facilitating easy removal for cleaning or replacement. A safety side plate 527 is provided between each second vertical support rod 521 and the respective side support rod 522, and the safety buckles 526 are arranged on the safety side plates 527. The second seat plate 525 is made of fabric material. The side support rods 522 are provided with sleeves 522*a*, and the back support rod 524 is detachably inserted into the sleeves 522*a*, facilitating storage, packaging, and transportation. In one embodiment, the back support rod 524 is equipped with a soft backrest for comfortable leaning and rest.

In one embodiment, the handle assembly 6 is disposed on the first vertical support rod 511 or the second vertical support rod 521 to be connected to the horizontal support rod 41. Further, the handle assembly 6 includes a connecting segment 61 and a handle segment 62, the connecting segment 61 is equipped with a collapsible structure, allowing the handle assembly 6 to be folded against the first vertical support rod 511 or the second vertical support rod 521, thus reducing storage space and facilitating packaging and transportation.

Figure 8:
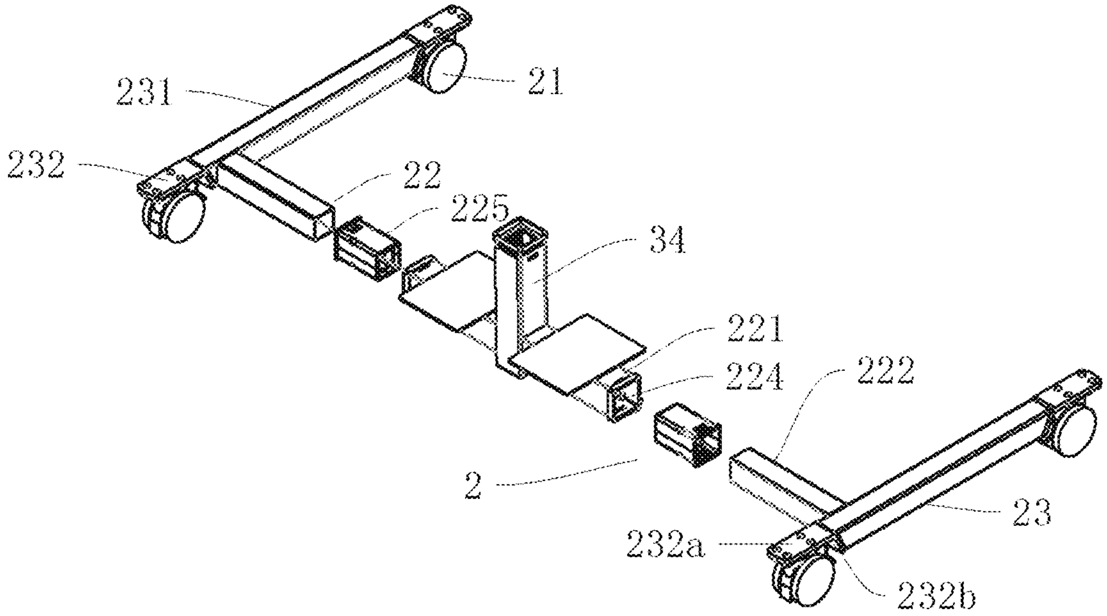
FIG. 8 is an exploded schematic view showing the structure of the lower portion of the transfer bench according to another embodiment of the present disclosure.

Referring to FIG. 8, in one embodiment, the bottom frame 2 includes a transverse assembly frame 22 and support legs 23 on both sides, with a plurality of casters 21 mounted on the support legs 23. The transverse assembly frame 22 includes a first transverse rod 221 and second transverse rods 222 on both sides thereof. The relative position between the first transverse rod 221 and each second transverse rod 222 is transversely adjustable, facilitating width adjustment of the bottom frame 2 as needed to adapt to width dimensions of individuals of different body types, thereby improving seating comfort. The transverse assembly frame 22 further includes fasteners 223. The first transverse rod 221 is configured with threaded holes 224, and the second transverse rods 222 may be secured via the fasteners 223 at the threaded holes 224, thereby fixing the relative positions of the second transverse rods 222. When the fasteners 223 are removed, the second transverse rods 222 can be retracted into the first transverse rod 221, achieving detachability and facilitating storage, packaging, and transportation.

In one embodiment, the transverse assembly frame 22 further includes wear-resistant sleeves 225 between the first transverse rod 221 and the second transverse rods 222. The wear-resistant sleeves 225 are press-fitted in the first transverse rod 221. The fasteners 223 are screws, and the threaded holes 224 are formed in areas of the first transverse rod 221 corresponding to the wear-resistant sleeves 225, and clearance holes are correspondingly formed on the wear-resistant sleeves 225 at the locations of the threaded holes 224. The wear-resistant sleeves 225 are made of plastic material, enabling a tight fit between each second transverse rod 222 and the first transverse rod 221, so as to prevent wear between them during use or disassembly, and also to minimize loosening or abnormal noise during use. In one embodiment, the threaded end of the screw is provided with a flexible part made of plastic rubber pellets, which tightly engages the wear-resistant sleeve 225 to increase friction and further prevent scratching between the first transverse rod 221 and the second transverse rod 222.

In one embodiment, the fasteners 223 are obliquely connected to the outer side of the first transverse rod 221, and their heads are close to the lower part of the bottom frame 2. On one hand, this prevents interference with the user when seated, ensuring riding safety, and on the other hand, the bottom frame 2 can be lifted for adjusting the width of the transverse assembly frame 22 and disassembling it when required, facilitating easy operation.

In one embodiment, the support legs 23 are disposed at ends of the transverse assembly frame 22. Each support leg includes a support foot rod 231 and mounting members 232 at both ends thereof. Each mounting member 232 includes a first segment 232*a* and a second segment 232*b* inclined relative to the first segment 232*a*. An installation space for the casters 21 is formed below the first segment 232*a* and the second segment 232*b*, and the second segment 232*b* is fixedly connected to the support foot rod 231. The upper surfaces of the mounting member 232 and the support foot rod 231 are approximately in the same plane, which on one hand facilitates smooth passage over obstacles on the ground, and on the other hand enhances the aesthetics of the transfer bench 1. In one embodiment, the mounting member 232 is integrally formed by bending, which simplifies the manufacturing process and improves the product strength.

In one embodiment, the support member 3 includes a bottom support rod 34, a top support rod 35, and an adjustment mechanism 33 for adjusting the height of the support member 3. The adjustment mechanism 33 may, for example, be a lead screw and nut mechanism or a hydraulic adjustment mechanism. In one embodiment, the second transverse rod 222 is fixedly connected to the support leg 23, and the middle part of the first transverse rod 221 is fixedly connected to the bottom support rod 34 of the support member 3, allowing the transfer bench 1 to be divided into multiple parts for facilitating storage, packaging, transportation, and installation.

When the adjustment mechanism 33 is a height adjustment mechanism including a lead screw and a nut, it further includes an operating member mounted on the protrusion 32 of the support member 3, and the height of the support member 3 is adjusted via the operating member. In one embodiment, the operating member includes a storage shaft 333*a* with a storage groove 333*c* and a handle 333*b* connected thereto. In operation, the handle 333*b* is vertically connected to the storage shaft 333*a*, facilitating rotation of the handle 333*b* to raise or lower the support member 3. When not in use, the handle 333*b* can be stored in the storage groove 333*c* of the storage shaft 333*a* to free up more space.

Figure 9:
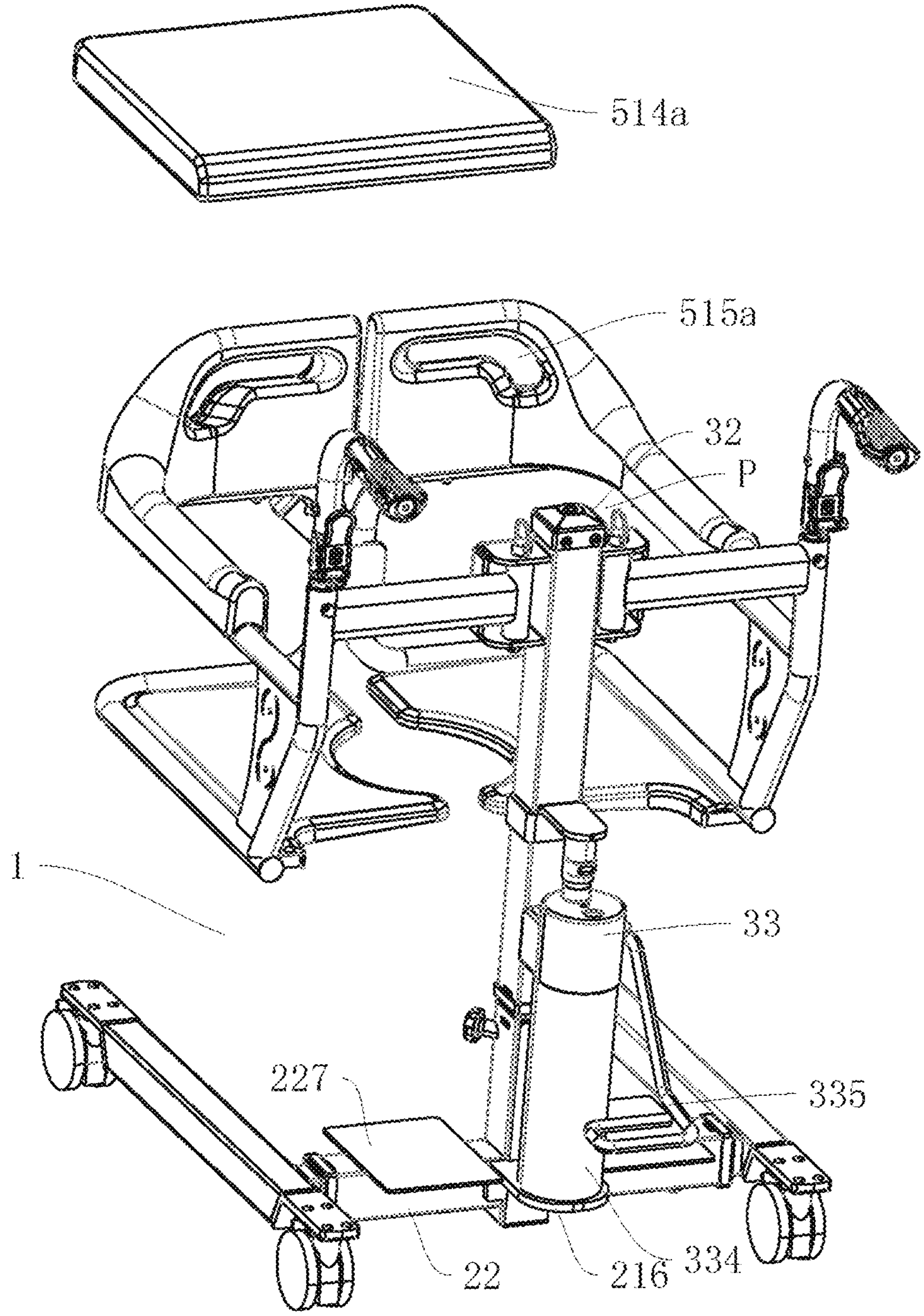
FIG. 9 is a schematic view of another embodiment of the present disclosure.

Referring to FIG. 9, in another embodiment, when the adjustment mechanism 33 adopts a hydraulic lifting adjustment mode, it includes a hydraulic pump 334 disposed beside the support member 3. The hydraulic pump 334 is mounted on a bearing plate 216, which itself is installed on the transverse assembly frame 22. A drive unit 335 is provided beside the hydraulic pump 334 for driving the hydraulic pump 334 to raise or lower the support member 3.

In one embodiment, the first transverse rod 221 and the second transverse rods 222 of the transverse assembly frame 22 have approximately square-shaped cross-sections. A flat plate-shaped foot pedal 227 is mounted on the transverse assembly frame 22. The food pedal 227 is fixed to the transverse assembly frame 22 by welding, which not only facilitates manufacturing but also can be used to adjust the height of the support member 3, thereby enhancing user comfort. In one embodiment, the support member 3 and the support foot rods 231 are roughly square in shape, which not only simplifies manufacturing but also enhances the overall aesthetics of the transfer bench 1.

The above embodiments are only used to illustrate the technical solutions of the present application rather than limiting the present application. Although the present application has been described in detail with reference to the foregoing embodiments, those of ordinary skill in the art should understand that they can still modify the technical solutions recorded in the foregoing embodiments, or equivalently replace some or all of the technical features therein; and these modifications or replacements do not make the essence of the corresponding technical solutions deviate from the scope of the technical solutions of the embodiments of the present application.

What is claimed is:

1. A transfer bench, comprising:

a bottom frame with a plurality of casters, a support member having a vertical axis and connected to the bottom frame, a horizontal member provided on the support member and extending from the support member to two sides of the support member in a horizontal direction, a seat frame connected to the horizontal member, and handle assemblies connected to the horizontal member, wherein the support member is provided with a mounting portion configured to detachably connect the horizontal member to the support member, the support member is further provided with a protrusion higher than the mounting portion, and the horizontal member is detachably connected to the support member by dowel pins.

2. The transfer bench according to claim 1, wherein the horizontal member comprises two horizontal support rods respectively disposed on the two sides of the support member, the mounting portion is correspondingly provided on the two sides of the support member, and the seat frame is connected to the two horizontal support rods.

3. The transfer bench according to claim 2, wherein the seat frame comprises two closure frames, the two closure frames are laterally openable and fixed respectively on the two horizontal support rods, and each of the two horizontal support rods is configured to be laterally pivotable around a respective one of the dowel pins together with a respective one of the two closure frames to form an opened operational state and a closed operational state.

4. The transfer bench according to claim 3, wherein each of the two closure frames comprises a vertical support rod connected to the horizontal member, a frame loop connected to the vertical support rod, and a seat plate mounted on the frame loop.

5. The transfer bench according to claim 4, wherein the frame loop comprises a side support rod and a back support rod, the seat plate comprises a left seat plate segment and a right seat plate segment and is configured with an opening in a central region of the seat plate, each of the left seat plate segment and the right seat plate segment is mounted on the side support rod and the back support rod and comprises a first edge, a second edge and a third edge, an angle $\alpha$ between a tangent line of the first edge adjacent to the side support rod and the side support rod is less than or equal to 90 degrees.

6. The transfer bench according to claim 5, wherein the second edge is configured such that a distance of the second edge from the side support rod gradually increases in a direction away from the first edge, distances from both the second edge and the third edge to the back support rod gradually decrease in the direction away from the first edge, and a region enclosed by the first edge and an extension line of the second edge toward the side support rod forms a reinforced section of the seat plate.

7. The transfer bench according to claim 6, wherein the side support rod is provided with a protective sleeve, and the back support rod is provided with a second protective sleeve.

8. The transfer bench according to claim 7, wherein the second protective sleeve on the back support rod is configured with a horizontally L-shaped handhold groove.

9. The transfer bench according to claim 6, wherein the side support rod comprises an upper segment and a lower segment that are mutually parallel, the back support rod is configured as a bent segment, and the frame loop is formed by bending a single pipe.

10. The transfer bench according to claim 4, wherein the vertical support rod is formed by bending a single pipe and comprises a vertical segment extending vertically and an inclined segment, a first end of the vertical segment is connected to a respective one of the two horizontal support rods, and a second end of the vertical segment is connected to an upper segment of a side support rod of the frame loop.

11. The transfer bench according to claim 1, wherein the seat frame comprises a frame assembly connected to the horizontal member, and the frame assembly comprises two vertical support rods respectively connected to two ends of the horizontal member, two side support rods on two sides of the frame assembly, and a seat cushion assembly and a back support rod arranged on the two side support rods.

12. The transfer bench according to claim 4, wherein each of the handle assemblies is arranged on the vertical support rod to be connected to a respective one of the two horizontal support rods, and each of the handle assemblies comprises a connecting segment and a handle segment.

13. The transfer bench according to claim 11, wherein each of the handle assemblies is arranged on a respective one of the two vertical support rods to be connected to a respective one of two horizontal support rods of the horizontal member, and each of the handle assemblies comprises a connecting segment and a handle segment.

14. The transfer bench according to claim 1, wherein the bottom frame comprises a transverse assembly frame and support legs arranged at two ends of the transverse assembly frame, each of the support legs comprises a support foot rod and mounting members at two ends of the support foot rod, and the plurality of casters are mounted on the support legs.

15. The transfer bench according to claim 14, wherein the transverse assembly frame comprises a first transverse rod, second transverse rods and fasteners located on two ends of the first transverse rod, the first transverse rod is configured with threaded holes, and each of the second transverse rods is fixed at a respective one of the threaded holes via a respective one of the fasteners.

16. The transfer bench according to claim 15, wherein the transverse assembly frame further comprises a wear-resistant sleeve between the first transverse rod and each of the second transverse rods.

17. The transfer bench according to claim 1, wherein the support member comprises a bottom support rod, a top support rod, and an adjustment mechanism for adjusting a height of the support member.

18. The transfer bench according to claim 15, wherein the first transverse rod and the second transverse rods have square cross-sections, and a flat plate-shaped foot pedal is provided on the transverse assembly frame.

19. A transfer bench, comprising:

a bottom frame comprising a transverse assembly frame and support legs arranged at two ends of the transverse assembly frame, wherein a plurality of casters are mounted on the support legs, the transverse assembly frame comprises a first transverse rod and second transverse rods located on two ends of the first transverse rod, and a relative position of the first transverse rod and the second transverse rods is adjustable transversely, a support member having a vertical axis and connected to the bottom frame, a horizontal member provided on the support member and extending from the support member to two sides of the support member in a horizontal direction, a seat frame connected to the horizontal member, the seat frame comprises a frame assembly connected to the horizontal member, the frame assembly comprises two vertical support rods respectively connected to two ends of the horizontal member, two side support rods on two sides of the frame assembly, and a seat cushion assembly and a back support rod arranged on the two side support rods, the seat cushion assembly comprises a seat plate and safety buckles, and the seat plate is detachably connected to the two side support rods by the safety buckles, and handle assemblies connected to the horizontal member, wherein the support member is provided with a mounting portion configured to detachably connect the horizontal member to the support member, and the support member is further provided with a protrusion higher than the mounting portion.

* * * * *